(12) United States Patent
Duval et al.

(10) Patent No.: US 12,136,187 B2
(45) Date of Patent: *Nov. 5, 2024

(54) IMAGE PROCESSING SYSTEMS AND METHODS OF USING THE SAME

(71) Applicant: Boston Scientific Scimed, Inc., Maple Grove, MN (US)

(72) Inventors: George Wilfred Duval, Sudbury, MA (US); Kirsten Viering, Newton, MA (US); Louis J. Barbato, Franklin, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 362 days.

This patent is subject to a terminal disclaimer.

(21) Appl. No.: 17/648,824

(22) Filed: Jan. 25, 2022

(65) Prior Publication Data

US 2022/0261962 A1 Aug. 18, 2022

Related U.S. Application Data

(60) Provisional application No. 63/150,107, filed on Feb. 17, 2021.

(51) Int. Cl.
*G06V 10/50* (2022.01)
*G06T 3/4069* (2024.01)
(Continued)

(52) U.S. Cl.
CPC .............. *G06T 3/4069* (2013.01); *G06T 5/40* (2013.01); *G06T 7/0012* (2013.01); *G06V 10/50* (2022.01); *G06T 2207/10068* (2013.01)

(58) Field of Classification Search
CPC ................. G06T 3/4069; G06T 7/0012; G06T 2207/10068; G06T 7/262; G06T 5/40;
(Continued)

(56) References Cited

U.S. PATENT DOCUMENTS 5,164,993 A 11/1992 Capozzi et al.
8,861,886 B2 10/2014 Huo et al.
(Continued)

OTHER PUBLICATIONS

Non-Final Office Action issued in U.S. Appl. No. 17/479,388, dated Dec. 21, 2022 (19 pages).

(Continued)

*Primary Examiner* — Syed Haider
(74) *Attorney, Agent, or Firm* — Bookoff McAndrews, PLLC

(57) ABSTRACT

A method is provided for enhancing video images in a medical device. The method includes receiving a first image frame and a second image frame from one or more image sensors. The first image sub-blocks are generated by dividing the first image frame. At least one curve to the first image sub-blocks are associated based on one or more look-up tables. A target in at least one of the first image sub-blocks is identified. Second image sub-blocks are generated by dividing the second image frame. At least one curve is associated to the second image sub-blocks based on the one or more look-up tables. The target is identified in at least one of the second image sub-blocks. Histogram enhanced images of the target in the first image sub-blocks and the second image sub-blocks are generated. A video image stream is generated based on the histogram enhanced images of the target.

20 Claims, 8 Drawing Sheets

(51) Int. Cl.
  *G06T 5/40* (2006.01)
  *G06T 7/00* (2017.01)
(58) Field of Classification Search
  CPC . G06T 5/94; G06T 7/269; G06T 2207/10116; G06T 2207/10016; G06V 10/50
  See application file for complete search history.

(56) References Cited

U.S. PATENT DOCUMENTS

| | | | |
|---|---|---|---|
| 9,947,085 | B2 | 4/2018 | St. Romain, II et al. |
| 2010/0278423 | A1 | 11/2010 | Itoh et al. |
| 2012/0263366 | A1* | 10/2012 | Huo .................. G06T 5/92 |
| | | | 382/132 |
| 2012/0275658 | A1 | 11/2012 | Hurley et al. |
| 2014/0334667 | A1 | 11/2014 | Eswara et al. |
| 2016/0196639 | A1 | 7/2016 | Shin |
| 2016/0239967 | A1 | 8/2016 | Chou et al. |
| 2016/0328831 | A1* | 11/2016 | St. Romain, II .......... G06T 5/94 |
| 2016/0335751 | A1 | 11/2016 | Sidar et al. |
| 2017/0148158 | A1* | 5/2017 | Najarian ............... G06T 5/77 |
| 2017/0280069 | A1 | 9/2017 | Smith |
| 2017/0301095 | A1 | 10/2017 | Zhang et al. |
| 2019/0307313 | A1* | 10/2019 | Wade .............. A61B 17/00234 |
| 2020/0092526 | A1 | 3/2020 | Sidar et al. |
| 2020/0178937 | A1* | 6/2020 | Liu ..................... G06T 7/0012 |
| 2022/0092753 | A1 | 3/2022 | Duval et al. |

OTHER PUBLICATIONS

Anonymous: "Adaptive histogram equalization—Wikipedia", Feb. 6, 2014 (Feb. 6, 2014), XP055484979, Retrieved from the Internet: URL:https://en.wikipedia.org/w/index.php?title=Adaptive_histogram_equalization&oldid=594245673 [retrieved on Jun. 15, 2018] p. 2-p. 3.

International Search Report issued in International Application No. PCT/US2021/051074 dated Jan. 4, 2022 (15 pages).

Kentaro Kokufuta et al: "Real-Time Processing of Contrast Limited Adaptive Histogram Equalization on FPGA", 2010 International Conference on Field Programmable Logic and Applications (FPL), IEEE, Piscataway, NJ, USA, Aug. 31, 2010 (Aug. 31, 2010), pp. 155-158, XP031854493, ISBN: 978-1-4244-7842-2 abstract p. 157, left column.; figures 1,3.

Anonymous: "Curve fitting question—p. 1 ", Mar. 7, 2019 (Mar. 7, 2019), pp. 1-9, XP055916009, Retrieved from the Internet: URL:https://www.eevblog.com/forum/projects/curve-fitting-question/ [retrieved on Apr. 27, 2022].

Ding Chang et al: "Three Adaptive Sub-Histograms Equalization Algorithm for Maritime Image Enhancement", IEEE Access, IEEE, USA, vol. 8, Aug. 11, 2020 (Aug. 11, 2020), pp. 147983-147994, XP011806036, DOI: 10.1109/ACCESS.2020.3015839 [retrieved on AUg. 18, 2020].

International Search Report and Written Opinion in PCT/US2022/070329, dated May 25, 2022 (17 pages).

Kervrann C et al: "Statistical Model-Based Segmentation of Deformable Motion", Proceedings of The International Conference on Image Processing (ICIP) Lausanne, Sep. 16-19, 1996; [Proceedings of The International Conference on Image Processing (ICIP)], New York, IEEE, US, Sep. 16, 1996 (Sep. 16, 1996), pp. 937-940, XP000780755,DOI: 10.1109/ICIP.1996.559654ISBN: 978-0-7803-3259-1.

Ren J et al: "Research on compressed sensing equalization algorithms", 2016 IEEE International Conference on Signal and Image Processing (ICSIP), IEEE, Aug. 13, 2016 (Aug. 13, 2016), pp. 179-182, XP033081835,DOI: 10.1109/SIPROCESS.2016.7888248 [retrieved on Mar. 27, 2017].

Reza Ali M: "Realization of the Contrast Limited Adaptive Histogram Equalization (CLAHE) for Real-Time Image Enhancement", Journal of VLSI Signal Processing Systems for Signal, Image, and Video Technology, Springer, New York, NY, US, vol. 38, No. 1, Nov. 1, 2004 (Nov. 1, 2004), pp. 35-44, XP035934633, ISSN: 0922-5773, DOI: 10.1023/B:VLSI.0000028532.53893.82 [retrieved on Nov. 1, 2004].

Conrad Dare-Edwards, Contrast Enhancement with Piecewise Lookup Tables, Dr. Dobb's The World of Software Development, Mar. 1, 1998, https://drdobbs.com/contrast-enhancement-with-pieewise-look/184403469?pgno=1.

* cited by examiner

IMAGE PROCESSING SYSTEMS AND METHODS OF USING THE SAME

CROSS-REFERENCE TO RELATED APPLICATIONS

This patent application claims the benefit of priority under 35 U.S.C. § 119 to U.S. Provisional Patent Application No. 63/150,107, filed Feb. 17, 2021, which is herein incorporated by reference in its entirety.

TECHNICAL FIELD

Various aspects of the disclosure relate generally to image processing systems, devices, and related methods. Examples of the disclosure relate to systems, devices, and related methods for enhancing video images, among other aspects.

BACKGROUND

Technological developments have given users of medical systems, devices, and methods, the ability to conduct increasingly complex medical procedures on various patients. However, in the field of endoscopy, for example, accurately visualizing target treatment sites within a patient, for example, tumors or lesions located in a gastrointestinal tract of the patient, is a known challenge. Although image enhancement techniques using histogram enhancement methods improve image quality, highly iterative processes required for histogram enhancements may overburden the image processors, cause image processing delays, and/or limit its effectiveness for video images.

SUMMARY

Aspects of the disclosure relate to, among other things, systems, devices, and methods for providing an image processing system and sub-block generation logic, histogram enhancement logic, and sub-block prediction logic, among other aspects. Each of the aspects disclosed herein may include one or more of the features described in connection with any of the other disclosed aspects.

According to one aspect, a method is provided for enhancing video images in a medical device. The method includes receiving a first image frame and a second image frame from one or more image sensors. The first image sub-blocks are generated by dividing the first image frame. At least one curve to the first image sub-blocks are associated based on one or more look-up tables. A target in at least one of the first image sub-blocks is identified. Second image sub-blocks are generated by dividing the second image frame. At least one curve is associated to the second image sub-blocks based on the one or more look-up tables. The target is identified in at least one of the second image sub-blocks. Histogram enhanced images of the target in the first image sub-blocks and the second image sub-blocks are generated. A video image stream is generated based on the histogram enhanced images of the target.

Any of the methods described herein may include any of the following steps. The second image sub-blocks are generated by dividing the second image frame based on the first image sub-blocks. The target is identified in the at least one of the second image sub-blocks based on the at least one curve of the first image sub-blocks and the at least one curve of the second image sub-blocks. Histogram data of each of the first image sub-blocks and/or the second image sub-blocks are generated. The at least one curve of the first image sub-blocks and/or the at least one curve of the second image sub-blocks are determined at least based on the histogram data of each of the first image sub-blocks and/or each of the second image sub-blocks. The histogram data of each of the first image sub-blocks and/or the second image sub-blocks is generated at least by applying a cumulative distribution function to the target in the first image sub-blocks and/or the second image sub-blocks. Generating the histogram enhanced image frame includes interpolating the histogram data of each of the first image sub-blocks and/or the second image sub-blocks. A clipping level of the target is determined in the at least one of the first image sub-blocks. A clipping level of the target is determined in the at least one of the second image sub-blocks based on the clipping level of the target in the at least one of the first image sub-blocks. A piece-wise transformation is executed on the first image sub-blocks and/or the second image sub-blocks based on the one or more look-up tables. The target in at least one of the second image sub-blocks may be identified by predicting the target in the at least one of the second image sub-blocks based on similarities between the at least one curve of the first image sub-blocks and the at least one curve of the second image sub-blocks. The at least one curve includes a logarithmic curve, a power curve, an S-curve, a J-curve, or a piece-wise linear curve. The target is identified in at least one of the second image sub-blocks by determining first sub-block data based on one or more derivatives of the first image sub-blocks, and by determining second sub-block data based on one or more derivatives of the second image sub-blocks. The one or more derivatives of the first image sub-blocks and/or the second image sub-blocks include one or more derivatives of a gray-scale converted image and/or a color image. The one or more derivatives of the first image sub-blocks and/or the one or more derivatives of the second image sub-blocks include a first derivative and a second derivative. The target is located in the at least one of the second image sub-blocks based on similarities between the one or more derivatives of the first image sub-blocks and the one or more derivatives of the second image sub-blocks. The one or more derivatives of the first image sub-blocks and/or the second image sub-blocks include a second derivative. A clipping level of the target is determined in the at least one of the first image sub-blocks based on the one or more derivatives of the first image sub-blocks. A clipping level of the target is determined in the at least one of the second image sub-blocks based at least on the clipping level of the target in the at least one of the first image sub-blocks and the one or more derivatives of the second image sub-blocks.

According to one aspect, a medical device includes a shaft, one or more image sensors coupled to a distal end of the shaft, and at least one illumination device coupled to the distal end of the shaft. The medical device further includes one or more computer readable media storing instructions performing image processing to enhance video images and one or more processors configured to execute the instructions to perform the image processing. The one or more processors receive a first image frame and a second image frame from the one or more image sensors. The one or more processors generate first image sub-blocks by dividing the first image frame. The one or more processors associate at least one curve to the first image sub-blocks. The one or more processors identify a target in at least one of the first image sub-blocks. The one or more processors generate second image sub-blocks by dividing the second image frame based on the first image sub-blocks. The one or more processors associate at least one curve to the second image sub-blocks based on the one or more look-up tables. The one or more processors identify the target in at least one of the second image sub-blocks. The one or more processors generate histogram enhanced images of the target in the first image sub-blocks and the second image sub-blocks. The one or more processors generate a video image stream based on the histogram enhanced images of the target.

Any of the medical device described herein may include any of the flowing features. The one or more image sensors comprise a front facing image sensor and/or a side facing image sensor. The one or more processors generate histogram data of each of the first image sub-blocks and/or the second image sub-blocks. The at least one curve of the first image sub-blocks and/or the at least one curve of the second image sub-blocks are determined at least based on the histogram data of each of the first image sub-blocks and/or each of the second image sub-blocks. The one or more processors determine first sub-block data based on one or more derivatives of the first image sub-blocks. The one or more processors determine second sub-block data based on one or more derivatives of the second image sub-blocks.

According to one aspect, a non-transitory computer-readable medium stores instructions for enhancing video images. The instructions, when executed by one or more processors, cause the one or more processors to perform operations. The one or more processors receive a first image frame and a second image frame from one or more image sensors. The one or more processors generate first image sub-blocks by dividing the first image frame. The one or more processors associate at least one curve to the first image sub-blocks based on one or more look-up tables. The one or more processors identify a target in at least one of the first image sub-blocks. The one or more processors generate second image sub-blocks by dividing the second image frame. The one or more processors associate at least one curve to the second image sub-blocks based on the one or more look-up tables. The one or more processors identifying the target in at least one of the second image sub-blocks. The one or more processors generate histogram enhanced images of the target in the first image sub-blocks and the second image sub-blocks. The one or more processors generate a video image stream based on the histogram enhanced images of the target.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

DETAILED DESCRIPTION

Figure 1:
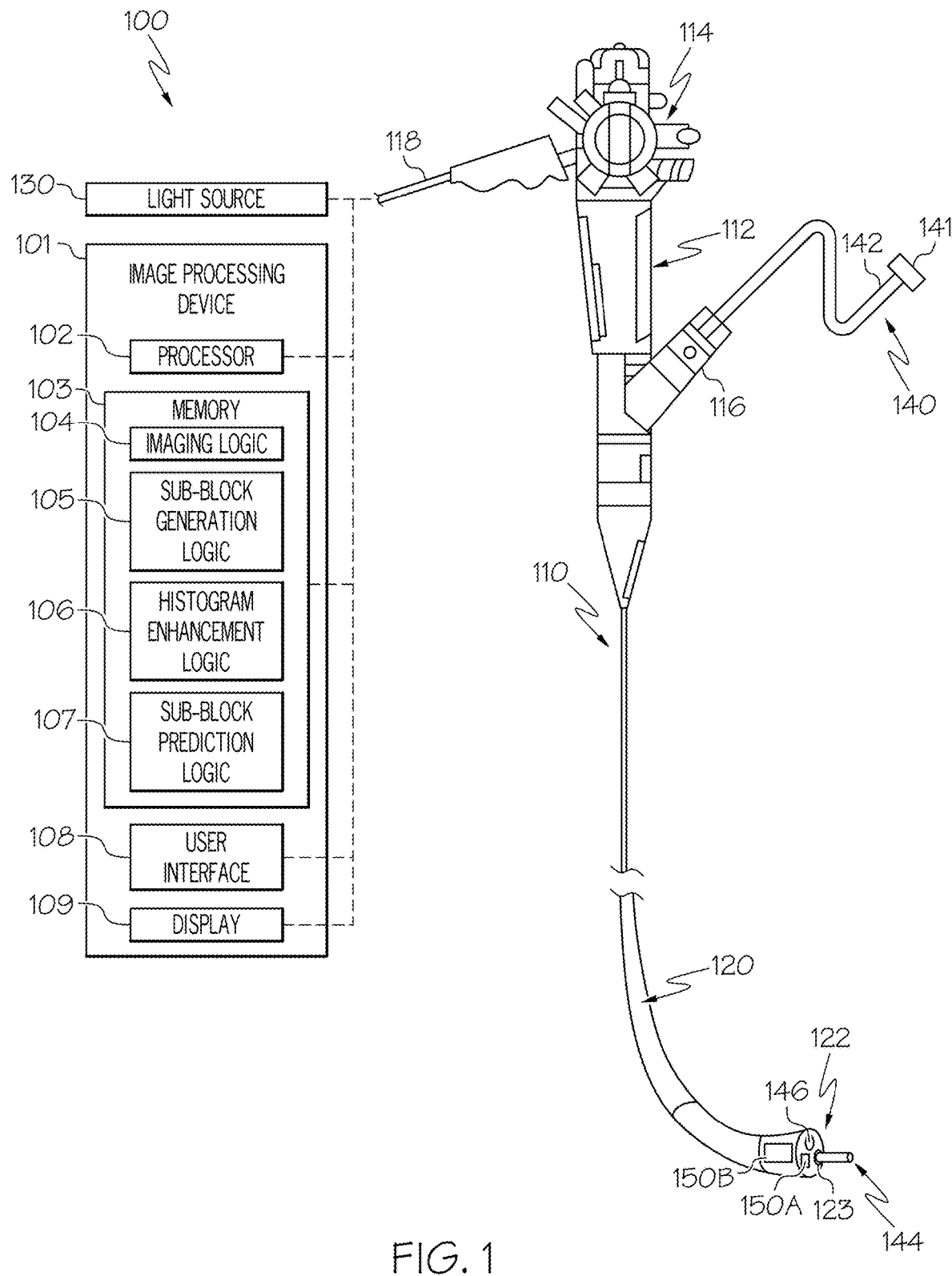
FIG. 1 is a schematic view of an exemplary medical system, according to aspects of this disclosure.

Examples of the disclosure include systems, devices, and methods for enhancing video images of one or more treatment sites within a subject (e.g., patient) using image contrast enhancement techniques. Reference will now be made in detail to aspects of the disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the subject. As used herein, the terms "comprises," "comprising," or any other variation thereof, are intended to cover a non-exclusive inclusion, such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal." As used herein, the terms "about," "substantially," and "approximately," indicate a range of values within +/−10% of a stated value.

Examples of the disclosure may be used to capture video image frames of one or more treatment/diagnostic sites within a subject using one or more image sensors of a medical system. In some embodiments, a medical device may include an image processing device including a processor and a memory storing one or more executable instructions and algorithms for enhancing video image frames of one or more treatment/diagnostic sites of a patient. Further, the processor and the memory may generate contrast enhanced image frames using look-up tables with fixed curves and sub-block reduction techniques. In embodiments, the memory may include programmable and executable instructions in accordance with an imaging logic, a sub-block generation logic, a histogram enhancement logic, and a sub-block prediction logic. Further, the image processing device may include a user interface operable to receive a user input thereon. The processed image produced by the image processing device of the medical device may include enhanced video image frames with pixel values that may be outputted to a display device.

Examples of the disclosure may relate to systems, devices and methods for performing various medical procedures and/or treating portions of the large intestine (colon), small intestine, cecum, esophagus, any other portion of the gastrointestinal tract, and/or any other suitable patient anatomy (collectively referred to herein as a "target treatment site"). Various examples described herein include single-use or disposable medical devices, or sterilizable, reusable devices. Reference will now be made in detail to examples of the disclosure described above and illustrated in the accompanying drawings. Wherever possible, the same reference numbers will be used throughout the drawings to refer to the same or like parts.

FIG. 1 shows a schematic depiction of an exemplary medical system 100 in accordance with an example of this disclosure. The medical system 100 may include one or more light sources 130, an image processing device 101, a medical instrument 110, and a medical device 140. The image processing device 101 may be communicatively coupled to the medical instrument 110 by, for example, a wired connection 118, a wireless connection, and the like. In examples, the image processing device 101 is a computer system incorporating a plurality of hardware components that allow the image processing device 101 to receive data (e.g., image sensor data), process information (e.g., intensity, motion, or spectral data and the like), and/or generate a processed image or a video image stream for outputting to a user of the medical system 100. Illustrative hardware components of the image processing device 101 may include at least one processor 102, at least one memory 103, at least one user interface 108, and at least one display 109.

The processor 102 of the image processing device 101 may include any computing device capable of executing machine-readable instructions, which may be stored on a non-transitory computer-readable medium, for example, the memory 103 of the image processing device 101. By way of example, the processor 102 may include a controller, an integrated circuit, a microchip, a computer, and/or any other computer processing unit operable to perform calculations and logic operations required to execute a program. As described in greater detail herein, the processor 102 is configured to perform one or more operations in accordance with the instructions stored on the memory 103.

Still referring to FIG. 1, the memory 103 of the image processing device 101 may include a non-transitory computer readable medium that stores machine-readable instructions thereon, for example, an imaging logic 104, a sub-block generation logic 105, a histogram enhancement logic 106, and a sub-block prediction logic 107. The imaging logic 104 may include executable instructions or algorithms that allow the medical system 100 to capture digital images (e.g., raw digital images) by activating one or more components of the medical instrument 110, for example, image sensors 150A and 150B and one or more light sources 130. The image sensors 150A and 150B may include, for example, one or more color image sensors and/or monochromatic image sensors. As shown in FIG. 1, the image sensor 150A may be a forward facing sensor, whereas the image sensor 150B may be a peripheral sensor, or a side-facing sensor. The image sensors 150A and 150B may be any combination of forward or side-facing sensors. The image sensors 150A and 150B may be configured and operable to capture raw images (e.g., digital images) or other sensed data of a surrounding environment of a tip 122 of a shaft 120 of the medical instrument 110. In some embodiments, the image sensors 150A and 150B may include one or more image sensors, for example, an RGB (i.e., red-green-blue) digital sensor, an RGB-Ir (i.e., red-green-blue-infrared) digital sensor, a monochrome sensor, and/or the like. The image sensors 150A and 150B may include one or more components for filtering colors from white light, ultraviolet light, near-infrared light, and/or other wavelengths within or beyond a visible spectrum. The one or more light sources 130 may be configured to emit white light, color light (e.g., red, blue, and green), ultraviolet light, near-infrared (NIR) light, and/or various other wavelengths within or beyond a visible spectrum. The one or more light sources 130 may be one or more light-emitting diodes (hereinafter LEDs). Further, the image sensors 150A and 150B of the medical instrument 110 may be communicatively coupled to the image processing device 101 of the medical system 100, for example, via the wired connection 118, a wireless connection, and/or the like.

In one embodiment, the image sensors 150A and 150B may include one or more photosensor arrays (not shown) that may be configured and operable to convert a light beam received by the one or more photosensor arrays into an electric current. For example, an electric current may be generated by the one or more photosensor arrays arranged on the image sensors 150A and 150B when photons from the received light are absorbed by a plurality of photosites (not shown) arranged on the one or more photosensor arrays. Further, each of the plurality of photosites may be operable to receive, capture, and absorb different wavelengths of the incoming light at a location of the photosites along a surface of the one or more photosensor arrays. Accordingly, the plurality of photosites may capture the incoming light and may generate an electrical signal which is quantified and stored as a numerical value in a resulting processed image file. It should be appreciated that the one or more photosensor arrays may include various suitable shapes, sizes, and/or configurations.

In some embodiments, the memory 103 (e.g., imaging logic 104, sub-block generation logic 105, histogram enhancement logic 106, and sub-block prediction logic 107) of the image processing device 101 may include a contrast limited adaptive histogram equalization (CLAHE) algorithm in order to enhance video image frames. CLAHE is an image processing algorithm to intensify the contrast of both luminance and color in image regions where differences between neighboring pixels are small. As a result, fine details that are enhanced may be better detected and diagnosed by a physician. In embodiments, the medical instrument 110 (e.g., an endoscope) using CLAHE may provide enhanced images of polyps or blood vessels on an intestine wall. In embodiments, these images are real-time video image frames captured by the image sensor(s) 150A and/or 150B of the medical instrument 110.

Still referring to FIG. 1, the sub-block generation logic 105 may include executable instructions or algorithms that allow the medical system 100 to, for example, generate a plurality of sub-blocks (or tiles) by dividing one or more image frames captured by the image sensor(s) 150A and/or 150B. In one embodiment, the sub-block generation logic 105 may perform one or more iterations to determine a best fit size for each of the plurality of sub-blocks. The histogram enhancement logic 106 may include executable instructions or algorithms (e.g., CLAHE) that allow the medical system 100 to, for example, generate one or more histograms for each of the plurality of sub-blocks generated by the sub-block generation logic 105. The one or more histograms may represent the counts of the occurrences of values of the intensity (or grayscale) in the image of the plurality of sub-blocks. The histogram enhancement logic 106 may also determine one or more clipping threshold levels to clip the one or more histograms generated for each of the plurality of sub-blocks in order to enhance various features in the one or more image frames. In one embodiment, the histogram enhancement logic 106 may perform one or more iterations to determine a best clipping threshold level for enhancing the one or more image frames without distorting the images. Further, the histogram enhancement logic 106 may include executable instructions or algorithms (e.g., CLAHE) that allow the medical system 100 to, for example, map the histogram enhanced images and perform interpolation to render enhanced image frames in order to generate a video image stream.

Still referring to FIG. 1, the sub-block prediction logic 107 may include executable instructions or algorithms that allow the medical system 100 to, for example, predict and/or identify one or more sub-blocks of an image frame containing a region of interest (or a target feature). The one or more sub-blocks identified by the sub-block prediction logic 107 may be utilized to transform the images of the plurality of sub-blocks generated by the sub-block generation logic 105. The images of the plurality of sub-blocks may be transformed based on one or more look-up tables associated with one or more fixed curves or graphs. The one or more fixed curves or graphs may include, for example, a logarithmic curve, a power curve, an S-curve, a J-curve, a piece-wise linear curve, etc. The sub-block prediction logic 107 may assign (or select) one of the one or more fixed curves or graphs (or look-up table curves) to at least one of the histograms generated by the histogram enhancement logic 106. The assignment of the look-up table curves to the histograms may depend on the distribution of the grayscale values in the histograms of the images of the plurality of sub-blocks. The histogram enhancement logic 106 may utilize the assigned look-up table curves to perform contrast enhancement of the images captured by the image sensors 150A and 150B.

Still referring to FIG. 1, the sub-block prediction logic 107 may also utilize derivatives of the images in the sub-blocks generated by the sub-block generation logic 105. The derivatives of the images may be utilized to identify and map the locations (or positions) of edges in the images of the sub-blocks. The sub-block prediction logic 107 may then predict and/or identify one or more regions of interest in the images of the sub-blocks based on the locations of edges in the images of the sub-blocks. The histogram enhancement logic 106 may then utilize the identified regions of interest to perform the contrast enhancements of this disclosure.

In some embodiments, the imaging logic 104, the sub-block generation logic 105, the histogram enhancement logic 106, and/or the sub-block prediction logic 107 may include executable instructions and algorithms that allow the medical system 100 to execute periodic image processing of a target site automatically without requiring user input. In other embodiments, the image processing device 101 may be configured to receive user inputs to initiate image processing of a target site, for example, from a user interface 108 of the image processing device 101. It should be appreciated that, in some embodiments, the user interface 108 may be a device integral with the image processing device 101, and in other embodiments, the user interface 108 may be a remote device in communication (e.g., wireless, wired, etc.) with the image processing device 101, including switches, buttons, or other inputs on the medical instrument 110.

It should be understood that various programming algorithms and data that support an operation of the medical system 100 may reside in whole or in part in the memory 103. The memory 103 may include any type of computer readable medium suitable for storing data and algorithms, such as, for example, random access memory (RAM), read only memory (ROM), a flash memory, a hard drive, and/or any device capable of storing machine-readable instructions. The memory 103 may include one or more data sets, including, but not limited to, image data from one or more components of the medical system 100 (e.g., the medical instrument 110, the medical device 140, etc.).

Still referring to FIG. 1, the medical instrument 110 may be configured to facilitate positioning of one or more components of the medical system 100 relative to a subject (e.g., a patient), such as, for example, the medical device 140. In some embodiments, the medical instrument 110 may be any type of endoscope, duodenoscope, gastroscope, colonoscope, ureteroscope, bronchoscope, catheter, or other delivery system, and may include a handle 112, an actuation mechanism 114, at least one port 116, and a shaft 120. The handle 112 of the medical instrument 110 may have one or more lumens (not shown) that communicate with a lumen(s) of one or more other components of the medical system 100. The handle 112 further includes the at least one port 116 that opens into the one or more lumens of the handle 112. As described in further detail herein, the at least one port 116 is sized and shaped to receive one or more instruments therethrough, such as, for example, the medical device 140 of the medical system 100.

The shaft 120 of the medical instrument 110 may include a tube that is sufficiently flexible such that the shaft 120 is configured to selectively bend, rotate, and/or twist when being inserted into and/or through a subject's tortuous anatomy to a target treatment site. The shaft 120 may have one or more lumens (not shown) extending therethrough that include, for example, a working lumen for receiving instruments (e.g., the medical device 140). In other examples, the shaft 120 may include additional lumens such as a control wire lumen for receiving one or more control wires for actuating one or more distal parts/tools (e.g., an articulation joint, an elevator, etc.), a fluid lumen for delivering a fluid, an illumination lumen for receiving at least a portion of an illumination assembly (not shown), and/or an imaging lumen for receiving at least a portion of an imaging assembly (not shown).

Still referring to FIG. 1, the medical instrument 110 may further include a tip 122 at a distal end of the shaft 120. In some embodiments, the tip 122 may be attached to the distal end of the shaft 120, while in other embodiments the tip 122 may be integral with the shaft 120. For example, the tip 122 may include a cap configured to receive the distal end of the shaft 120 therein. The tip 122 may include one or more openings that are in communication with the one or more lumens of the shaft 120. For example, the tip 122 may include a working opening 123 through which the medical device 140 may exit from a working lumen of the shaft 120. It should be appreciated that other one or more openings at the tip 122 of the shaft 120 are not shown. The actuation mechanism 114 of the medical instrument 110 is positioned on the handle 112 and may include knobs, buttons, levers, switches, and/or other suitable actuators. The actuation mechanism 114 is configured to control at least a deflection of the shaft 120 (e.g., through actuation of a control wire).

The medical device 140 of the medical system 100 may include a catheter having a longitudinal body 142 between a proximal end 141 of the medical device 140 and a distal end 144 of the medical device 140. The longitudinal body 142 of the medical device 140 may be flexible such that the medical device 140 is configured to bend, rotate, and/or twist when being inserted into a working lumen of the medical instrument 110. The medical device 140 may include a handle at the proximal end 141 of the longitudinal body 142 that may be configured to move, rotate, and/or bend the longitudinal body 142. Further, the handle at the proximal end 141 of the medical device 140 may define one or more ports (not shown) sized to receive one or more tools through the longitudinal body 142 of the medical device 140.

Still referring to FIG. 1, the medical instrument 110 may be configured to receive the medical device 140 via the at least one port 116, through the shaft 120 via a working lumen, and to the working opening 123 at the tip 122. In this instance, the medical device 140 may extend distally out of the working opening 123 and into a surrounding environment of the tip 122, such as, for example, at a target treatment site of a subject as described in further detail below. The distal end 144 of the medical device 140 may extend distally from the tip 122 in response to a translation of the longitudinal body 142 through the working lumen of the shaft 120. The medical device 140 may include one or more end effectors (not shown) at the distal end 144 of the longitudinal body 142, for performing one or more operations at a target treatment site.

In one embodiment, the medical instrument 110 may be further configured to receive the one or more light sources 130 through the shaft 120 via at least one of the lumens of the medical instrument 110 for connection to an optical fiber 146. In the example, the one or more light sources 130 are shown as a separate component from the image processing device 101 such that the light sources 130 are coupled to the medical instrument 110 separately from the image processing device (e.g., via a cable). It should be appreciated that, in other embodiments, the one or more light sources 130 may be included on the image processing device 101 such that the light sources 130 may be communicatively coupled to the medical instrument 110 with the image processing device 101.

Still referring to FIG. 1, the tip 122 of the medical instrument 110 may include the optical fiber 146 and the image sensor(s) 150A and/or 150B at the tip 122. In one embodiment, the optical fiber 146 may be coupled to the one or more light sources 130 of the medical system 100, such that each of the one or more light sources 130 may transmit light through the single, optical fiber 146. Although not shown, it should be appreciated that multiple light sources 130 may be coupled to the optical fiber 146 via a fiber splitter/combiner. The optical fiber 146 of the medical instrument 110 may be configured and operable to deliver various amplitudes of light, from the one or more light sources 130, distally from the tip 122 of the shaft 120. In some embodiments, the optical fiber 146 may be configured to deliver white light, ultraviolet light, near-infrared (NIR) light, and/or various other wavelengths within or beyond a visible spectrum.

In other embodiments, the medical instrument 110 may include, although not shown, a multicolor LED assembly at the tip 122 of the shaft 120. The multicolor LED assembly may, for example, include one or more LEDs disposed in an annular array about the image sensor(s) 150A and/or 150B. Each of the LEDs may be configured and operable to transmit a different light wavelength and/or amplitude relative to one another. It should be understood that different illumination sources may generate different spectra (e.g., red, green, and blue colors).

In other embodiments, as further described herein, the image sensors 150A and 150B may be configured and operable to fully capture all incoming light at each individual pixel location of the image sensors 150A and 150B irrespective of a color of the incoming light.

Still referring to FIG. 1, the medical instrument 110 of the medical system 100 may be inserted within a subject's body (not shown) to position the tip 122 adjacent to a target site. For example, the shaft 120 may be guided through a digestive tract of a subject (e.g., patient) by inserting the tip 122 into a nose or mouth (or other suitable natural body orifice) of the subject's body and traversed through a gastrointestinal tract of the subject's body (e.g., an esophagus, a stomach, a small intestine, etc.) until reaching the target site. It should be appreciated that a length of the shaft 120 may be sufficient so that a proximal end of the medical instrument 110 (including the handle 112) is external of the subject, while the tip 122 of the medical instrument 110 is internal to the subject's body. While this disclosure relates to the use of the medical system 100 in a digestive tract of a subject, it should be understood that the features of this disclosure could be used in various other locations (e.g., other organs, tissue, etc.) within a subject's body.

Figure 2:
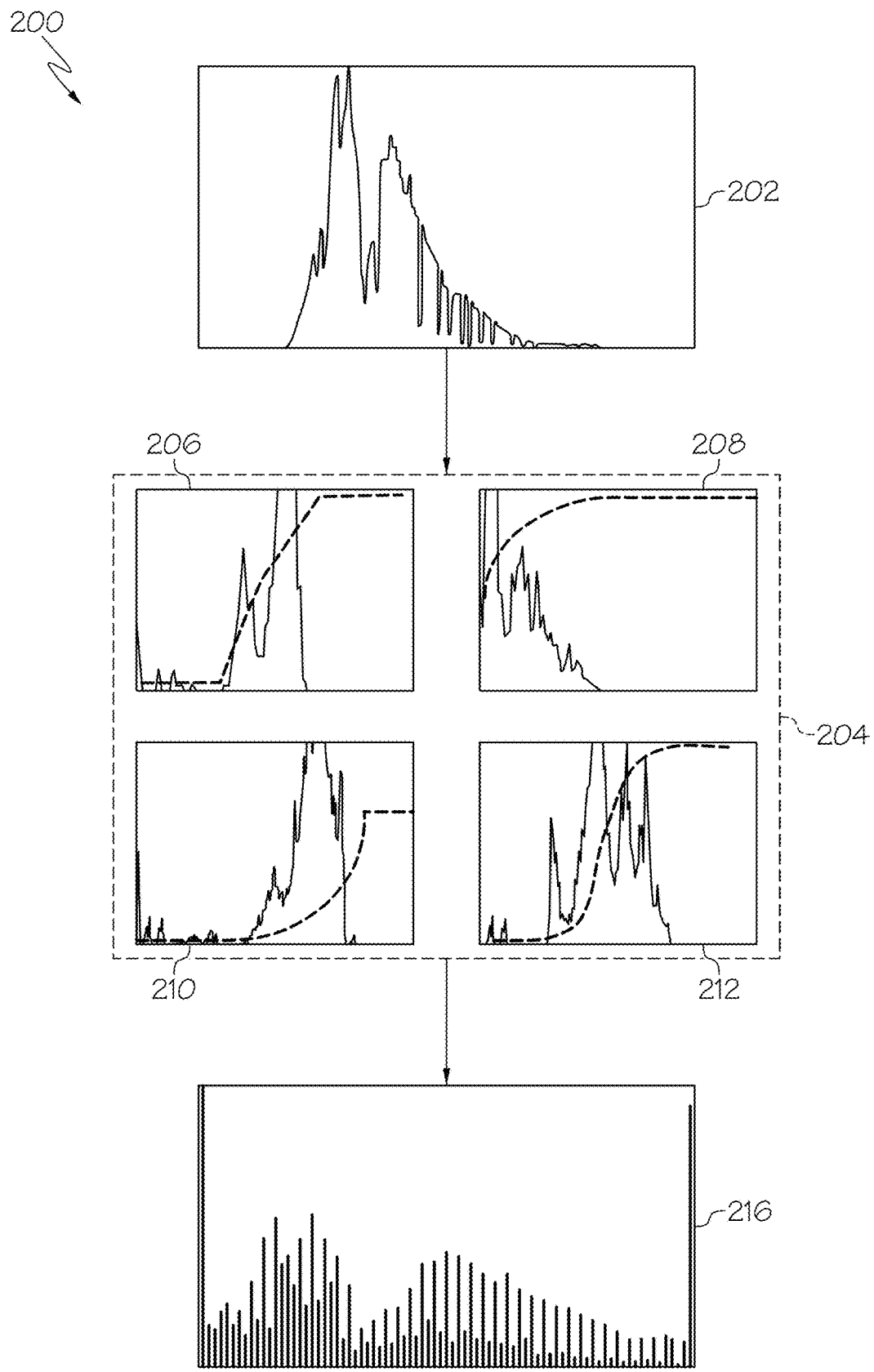
FIG. 2 illustrates an exemplary process of enhancing an image frame using the medical system of FIG. 1, according to aspects of this disclosure.

FIG. 2 shows an exemplary image enhancement process 200 that utilizes sub-block detection techniques to generate a contrast enhanced image in accordance with embodiments of this disclosure. In one exemplary embodiment of FIG. 2, the image sensor(s) 150A and/or 150B may capture an image frame(s) (e.g., a raw digital image frame) at a target site (e.g., an esophagus, a stomach, a small intestine, other organs, tissue, polyp, etc.) of a subject (e.g., patient) that may be illuminated by the light source 130 (or the multicolor LED assembly) at the tip 122 of the shaft 120. The histogram enhancement logic 106 may generate one or more histograms 202 for the image frames captured by the image sensor(s) 150A and/or 150B. For example, the histogram enhancement logic 106 may determine the intensity (or grayscale) levels of the pixels in the image frames and generate the one or more histograms 202 based on the frequency of intensity levels determined in the image frames.

Still referring to FIG. 2, the sub-block prediction logic 107 may assign (or select or fit) one or more fixed transform look-up table curves 204 (or look-up table curves 204) to the one or more histograms 202. The look-up table curves 204 may be predetermined and/or dynamically determined based on one or more adaptive algorithms (e.g., machine learning). In one embodiment, the look-up table curves 204 may be selected and fitted to the one or more histograms 202 based on the distribution characteristic (or shape) of the frequency of intensity levels in the one or more histograms 202. For example, the sub-block prediction logic 107 may assign: 1) a piecewise curve 206 to a histogram with a bimodal distribution characteristic; 2) a log or Nth root curve 208 to a histogram with a distribution characteristic shifted mostly to the left (e.g., dark shifted); 3) an inverse-log or Nth power curve 210 to a histogram with a distribution characteristic shifted relatively to the right (e.g., light shifted); and 4) an S-curve 212 to a histogram with a distribution relatively in the middle (e.g., mixed). Of course, other look-up table curves may be assigned based on other distribution characteristics of the histograms 202. The sub-block prediction logic 107 may store the information (or data) of the one or more histograms 202 fitted with the look-up table curves 204 for each image frame captured by the image sensor(s) 150A and/or 150B. The sub-block prediction logic 107 may compare the look-up table curves 204 assigned to the histograms of a current image frame with the look-up table curves 204 assigned to the histograms of a prior image frame, in order to quickly predict a region(s) of interest (or a target feature) in the image frames.

Still referring to FIG. 2, the histogram enhancement logic 106 may derive a cumulative distribution function (CDF) of the histogram for the sub-block containing the region(s) of interest (or a target feature) predicted by the sub-block prediction logic 107. The histogram enhancement logic 106 may then generate an equalized histogram 216 of the sub-block containing the predicted region(s) of interest by redistributing the pixel intensity levels based on the CDF. Further, the histogram enhancement logic 106 may utilize the look-up table curve(s) 204 assigned to the histogram 202 to generate the equalized histogram 216. That is, the histogram enhancement logic 106 may apply the look-up table curve values directly into the histogram 202 to generate the equalized histogram 216, which may reduce the amount of time that may be required for deriving the cumulative distribution function. In some embodiments, the equalized histogram 216 may over-amplify the contrast levels in highly concentrated pixel intensity region(s), which may cause noise to be amplified. As such, the histogram enhancement logic 106 may limit the over-amplification of contrast levels by clipping the equalized histogram 216 at a predetermined clipping threshold level. For example, the histogram enhancement logic 106 may redistribute the intensity values above the predetermined clipping threshold level into a bottom portion of the clipped histogram. In some instances, the redistribution of the intensity values above the clipping threshold level may result in excess intensity values. However, the redistribution of the intensity values may be repeated until the excess intensity values become negligible.

Figure 3A:
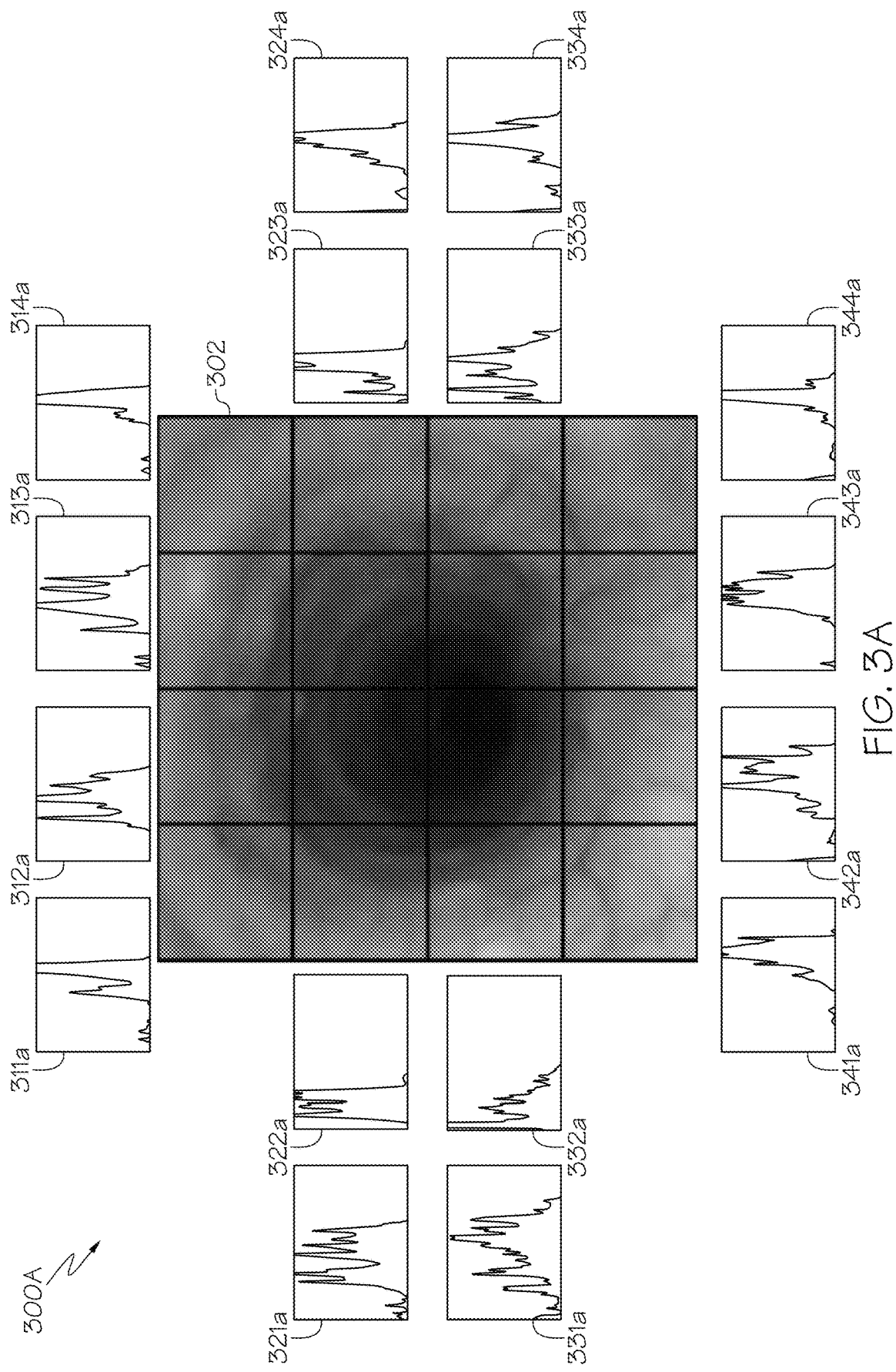
FIGS. 3A and 3B illustrate an exemplary process of enhancing video images using the medical system of FIG. 1, according to aspects of this disclosure.
Figure 3B:
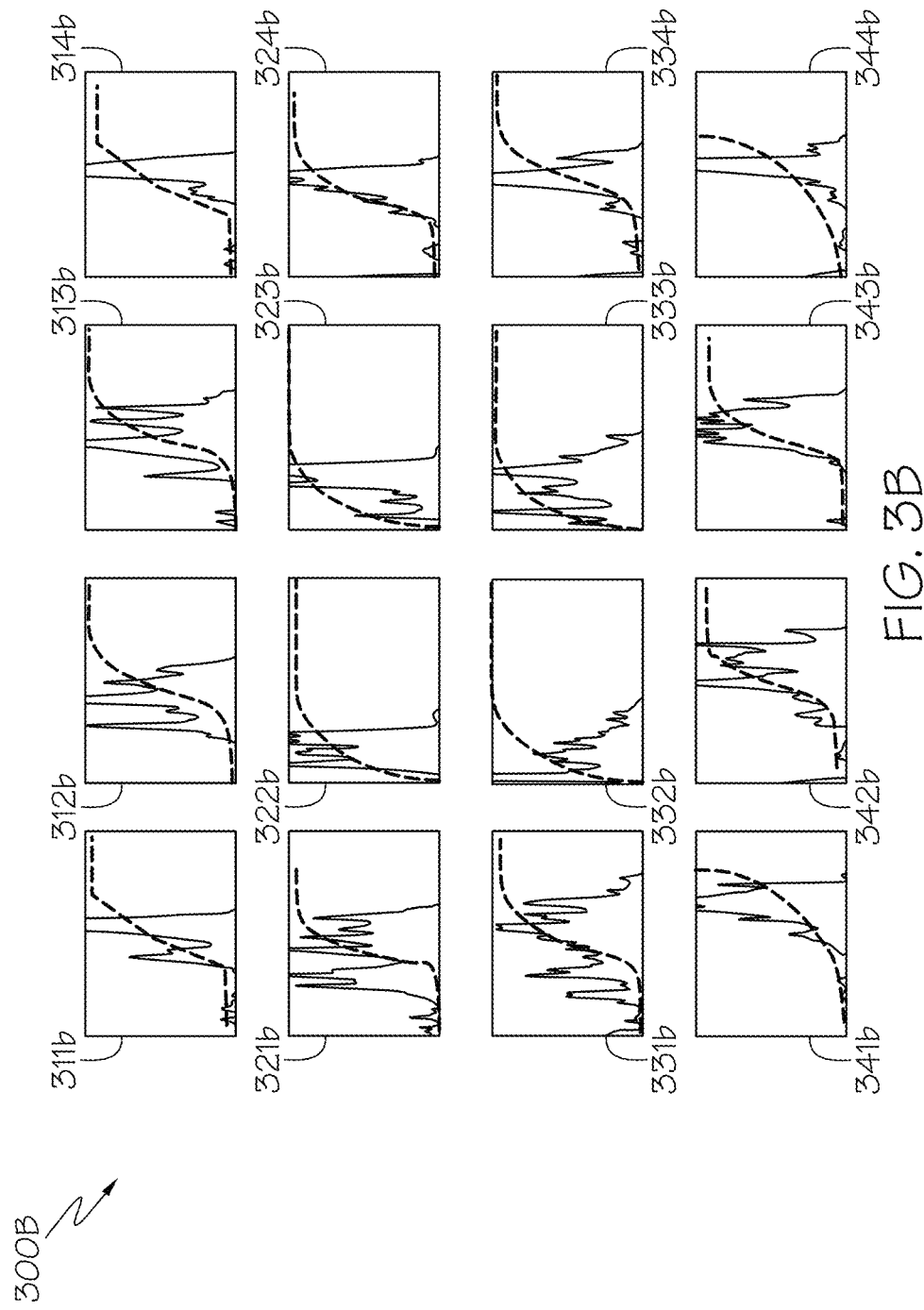

FIGS. 3A and 3B show exemplary video image enhancement processes 300A and 300B in accordance with an example of this disclosure. In one exemplary embodiment of FIG. 3A, the image sensor 150A may capture an image frame(s) 302 (e.g., a raw digital image frame) at a target site in the similar manner as described in reference to FIG. 2. The image sensor 150A may be a front facing image sensor moving within a lumen. The sub-block generation logic 105 may determine the number and/or size of sub-blocks of the image frame 302. For example, when the sub-block generation logic 105 receives the image frame 302, the sub-block generation logic 105 may divide the image frame 302 into a plurality of sub-blocks (e.g., into a 4×4 sub-block matrix). The sub-block generation logic 105 may perform one or more iterations to determine the ideal sub-block size to emphasize and enhance one or more features in the image frame 302. The image frame 302 may be divided into sub-blocks based on the homogeneity of the features in the image frame 302. That is, the sub-block generation logic 105 may determine the suitable size of the sub-blocks of image frame 302 based on significant changes in the quantity of color and/or intensity of the features in the image frame 302. The enhancement of the one or more features in the image frame 302 may improve, for example, a low light image by providing higher contrast. That is, the improved features in the image frame 302 may provide better visual depth in a lumen and/or better definition in vascularity structure of the walls of an intestine while guiding the medical instrument 110 in the target site for diagnostics and/or applied therapies.

Still referring to FIG. 3A, the histogram enhancement logic 106 may generate a plurality of histograms, for example, histograms 311a-314a, 321a-324a, 331a-334a, and 341a-344a, in the similar manner as described in reference to FIG. 2. For example, the histogram enhancement logic 106 may determine the frequency of intensity (or grayscale) levels of the pixels in each sub-block of the image frame 302 and generate the plurality of histograms 311a-344a. The histograms 311a-314a may be generated based on the image features in the first row of sub-blocks of the image frame 302. The histograms 321a-324a may be generated based on the image features in the second row of sub-blocks of the image frame 302. The histograms 331a-334a may be generated based on the image features in the third row of sub-blocks of the image frame 302. The histograms 341a-344a may be generated based on the image features in the fourth row of sub-blocks of the image frame 302. Although a four by four sub-block matrix is illustrated in FIG. 3A, the number of sub-blocks in the matrix of the image frame 302, for example, may vary according to the quantity of color and/or intensity of the features in the image frame 302. The sub-block prediction logic 107 may then determine a look-up table curve for each of the histograms 311a-344a, as shown in FIG. 3B.

Referring to FIG. 3B, the sub-block prediction logic 107 may assign look-up table curves 311b-344b to each of the histograms 311a-344a. The sub-block prediction logic 107 may include one or more algorithms for matching a histogram having a particular characteristic (or shape) with a particular type of look-up table curve. For example, in the first row of sub-blocks of the image frame 302, the histogram 311a may be assigned to (or fitted with) a look-up table curve 311b. The look-up table curve 311b may be a piecewise linear curve. The histogram 312a may be assigned to a look-up table curve 312b. The look-up table curve 312b may be an S-curve. The histogram 313a may be assigned to a look-up table curve 313b. The look-up table curve 313b may be an S-curve. The histogram 314a may be assigned to a look-up table curve 314b. The look-up table curve 314b may be a piecewise linear curve. The histograms 321a-344a of the sub-blocks of the image frame 302 may be assigned to the look-up table curves 321b-344b accordingly in the similar manner in reference to the histograms 311a-314a as described above. The look-up table curves 321b-344b may include, for example, a logarithmic curve, a power curve, an S-curve, a J-curve, a piece-wise linear curve, etc.

Still referring to FIGS. 3A and 3B, the sub-block prediction logic 107 may repeat the process 300A and 300B for each image frame captured by the image sensor 105A. That is, the sub-block prediction logic 107 may assign look-up table curves (e.g., 311b-344b) to the histogram of each sub-block of each image frame captured by the image sensor 105A. The histogram enhancement logic 106 may then utilize the information or data associated with the assigned look-up table curves assigned to the histograms of the sub-blocks to predict or identify the changes in the captured image frames. For example, the image sensor 150A moving within a lumen in a forward facing direction may capture images containing histogram profiles that may not vary greatly from one frame to the next frame. As such, the histogram enhancement logic 106 may rapidly detect or identify changes in the image frames by analyzing the differences and similarities in the look-up table curves assigned from one frame to the next frame. The histogram enhancement logic 106 may then utilize the detected changes to equalize the histogram associated with the sub-block containing the region of interest and perform contrast enhancement according to embodiments of this disclosure.

Figure 4A:
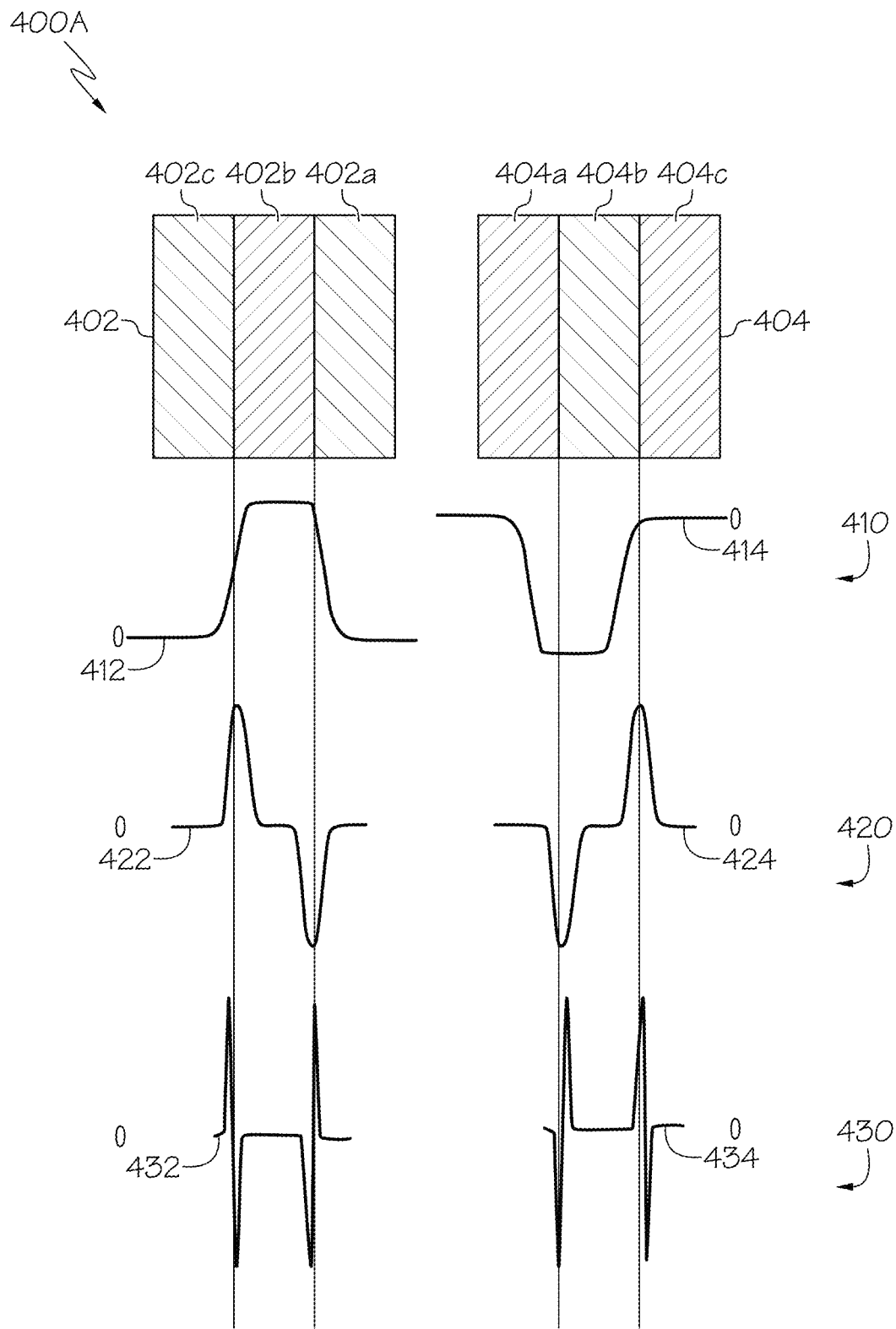
FIGS. 4A and 4B illustrate another exemplary process of enhancing video images using the medical system of FIG. 1, according to aspects of this disclosure.
Figure 4B:
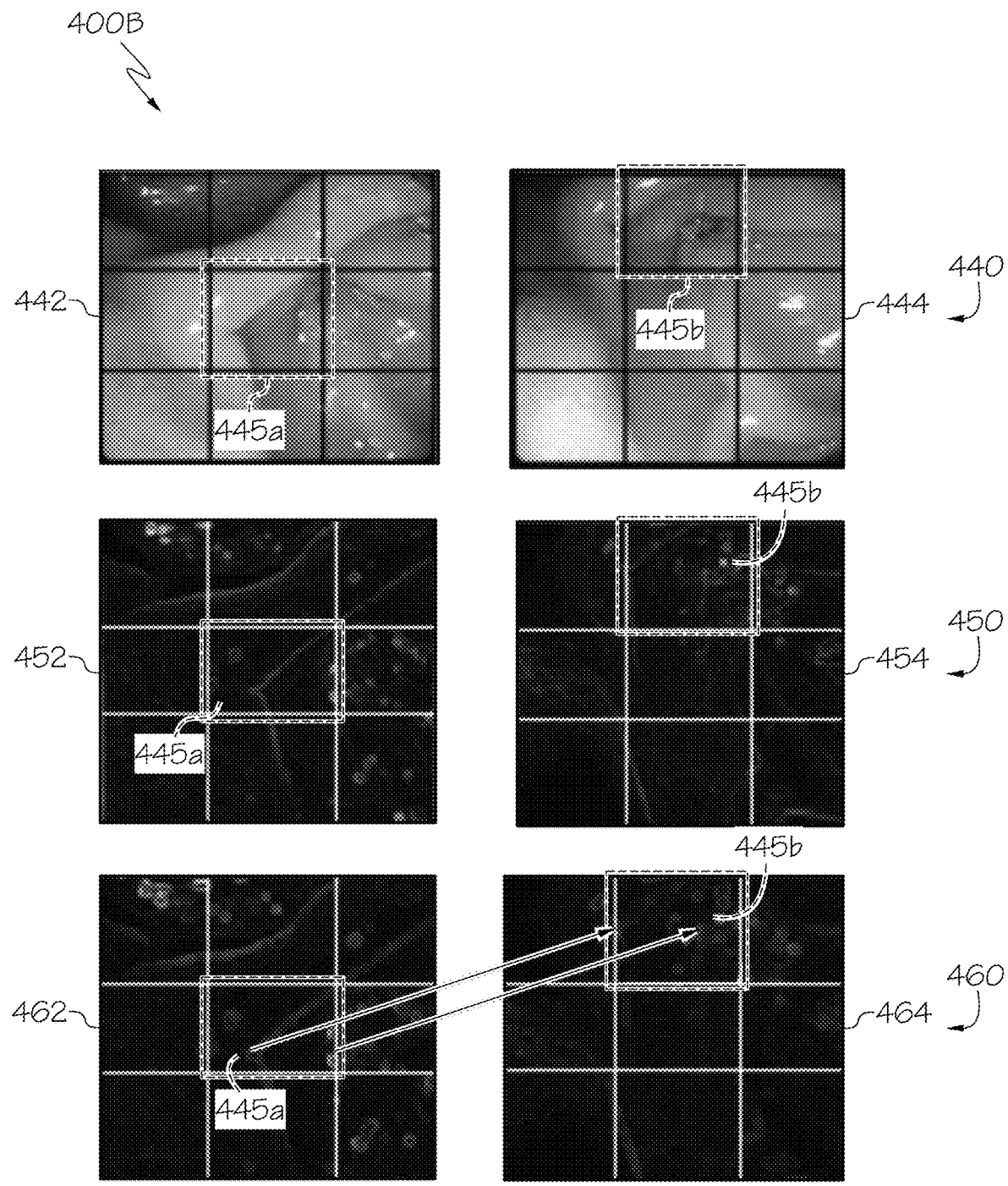

FIGS. 4A and 4B show exemplary video image enhancement processes 400A and 400B that utilize sub-block prediction (or reduction) techniques using derivatives to generate a contrast enhanced video image stream in accordance with embodiments of this disclosure. For example, the first and second derivatives of an image frame may be utilized to rapidly determine where changes may be occurring most in the image frame. The first and second derivatives of the image frame may be utilized to map where the edges of the features in the image frame may be located within the sub-blocks of the image frame. In one embodiment, a first feature 402 of an image frame may include a first dark section 402c, a light section 402b, and a second dark section 402a. The second features 404 of the image frame may include a first light section 404a, a dark section 404b, and a second light section 404c. At step 410, the sub-block prediction logic 107 may determine intensity profiles 412 and 414 based on the first feature 402 and the second feature 404, respectively. The intensity profiles 412 and 414 may identify the boundary between two different regions in the first and second features 402 and 404. At step 420, the sub-block prediction logic 107 may calculate first derivatives 422 and 424 of the intensity profiles 412 and 414, respectively. The first derivatives 422 and 424 may detect the local maxima and the local minima of the first feature 402 and the second feature 404. At step 430, the sub-block prediction logic 107 may calculate second derivatives 432 and 434 of the intensity profiles 412 and 414, respectively. The second derivatives 432 and 434 may identify the zero-crossing (e.g., lightest and darkest) contrasts of the intensity profiles 412 and 414. The first derivatives 422, 424 and the second derivatives 432, 434 may be calculated based on: 1) a gray-scale converted image; 2) the Y (luminance) channel of a YCbCr image (i.e., an image with luminance, blue-difference chroma component, and red-difference chroma component); or 3) using a color channel as a representative approximation (choosing a green channel may be preferred, since a typical image sensor is most sensitive in the green color channel). In some embodiments, a red channel (a typical shading of anatomical parts) may be utilized for calculating the first derivatives 422, 424 and the second derivatives 432, 434. The first derivatives 422, 424 and the second derivatives 432, 434 may be utilized by the sub-block prediction logic 107 to identify only the sub-block that needs modification and track only the regions of interests to perform finite sub-block contrast enhancements.

Referring to FIG. 4B, the exemplary video image enhancement process 400B may utilize the first and second derivatives derived in reference to the process 400A, in order to map out only the sub-blocks that need modification. In one exemplary embodiment of FIG. 4B, the image sensor 150B (e.g., a side-facing image sensor) may capture an image frame(s) (e.g., a raw digital image frame) at a target site (e.g., an esophagus, a stomach, a small intestine, other organs, tissue, polyp, etc.) of a subject (e.g., patient) that may be illuminated by the light source 130 (or the multicolor LED assembly) at the tip 122 of the shaft 120. Due to the nature of side viewing image sensors, the images detected by a side-facing image sensor (e.g., the image sensor 150B) may vary greatly from one frame to the next frame. For example, at step 440, the image sensor 150B may capture a first image frame 442 and a second image frame 444. The first image frame 442 may include a first target sub-block location 445a determined by the sub-block generation logic 105 and the histogram enhancement logic 106, in accordance with the processes described in FIGS. 2 and 3A-B. The second image frame 444 may include a second target sub-block location 445b determined by the sub-block generation logic 105 and the histogram enhancement logic 106, in accordance with the processes described in FIGS. 2 and 3A-B.

Still referring to FIG. 4B, at step 450, the sub-block prediction logic 107 may calculate and generate a first derivative frame 452 of the first image frame 442 and a first derivative frame 454 of the second image frame 444. At step 460, the sub-block prediction logic 107 may calculate and generate a second derivative frame 462 of the first image frame 442, and a second derivative frame 464 of the second image frame 444. In one embodiment, the sub-block prediction logic 107 may then identify the edges of the features in the first derivative frame 452 and/or the second derivative frame 462 of the first image frame 442. The sub-block prediction logic 107 may also identify the edges of the features in the first derivative frame 454 and/or the second derivative frame 464 of the second image frame 444. Further, the sub-block prediction logic 107 may identify the regions(s) or features of interest in the first target sub-block location 445a in the first derivative frame 452 and/or second derivative frame 462. The sub-block prediction logic 107 may then identify or determine the second target sub-block location 445b in the first derivative frame 454 and/or the second derivative frame 464 of the second image frame 444. The second target sub-block location 445b may be determined by identifying the similarities and differences between the edges in the first target sub-block location 445a of the first derivative frame 452 and/or the second derivative frame 462 and the edges in the first derivative frame 452 and/or the second derivative frame 464 of the second image frame 444. The sub-block prediction logic 107 may utilize the first and second derivative data determined at each frame to continuously compare with the first and second derivative data of the subsequent frames. This technique may quickly identify and track the regions of interest for performing the contrast enhancements in accordance with the embodiments of this disclosure. For example, the first derivative data may show indications of edge detection (where the key features may be tracked frame to frame) by detecting the local maxima and minima of an image. Subsequently, the second derivative data may highlight the zero crossings of the detected edges (where the edges go from lightest to darkest). Thus, the histogram enhancement logic 106 may reduce the overall processing time for performing the contrast enhancement of this disclosure by utilizing the target sub-block identification and tracking processes disclosed in FIGS. 4A and 4B.

Figure 5:
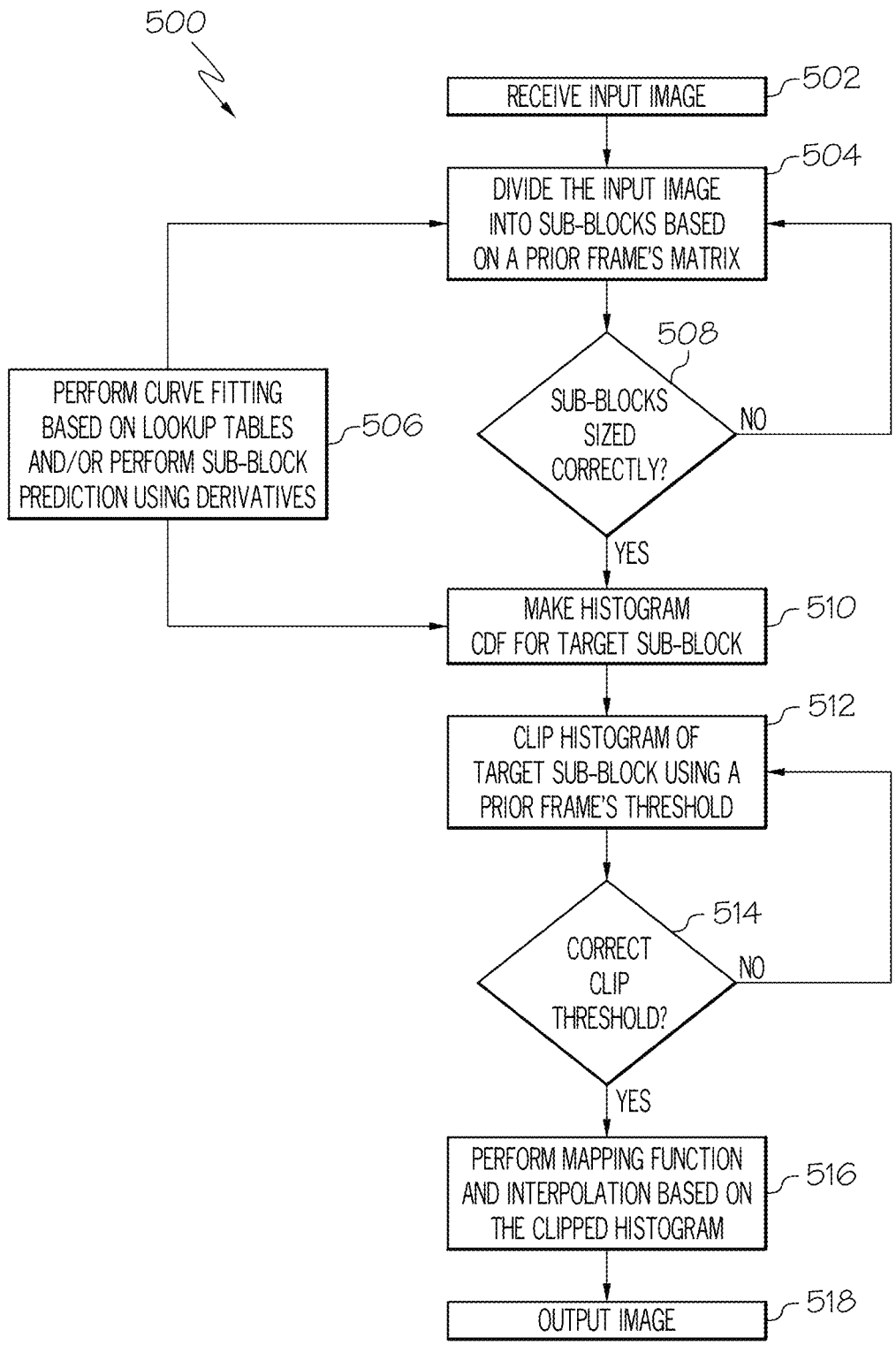
FIG. 5 illustrates yet another exemplary process of enhancing video images using the medical system of FIG. 1, according to aspects of this disclosure.

FIG. 5 shows an exemplary process 500 for enhancing image frames of a real-time video image stream by utilizing sub-block prediction and tracking techniques in accordance with the processes disclosed in FIGS. 2, 3A-B, and 4A-B. This exemplary process may greatly reduce the amount of time required for determining the regions or features of interest in a target sub-block of an image frame. As such, the exemplary process 500 may reduce delays in processing and displaying a real-time video image stream.

Still referring to FIG. 5, at step 502, the sub-block generation logic 105 may receive one or more input image frames (e.g., raw digital image frame) from the image sensor(s) 150A and/or 150B. At step 504, the sub-block generation logic 105 may divide a current image frame based on a prior image frame's sub-block matrix. That is, the sub-block generation logic 105 may start the sub-block size determination process for the current image frame with a predetermined sub-block size of the prior frame. In one embodiment, at step 506, the sub-block prediction logic 107 may assign one or more look-up table curves (e.g., look-up table curves 204) to the sub-block matrix of a prior image frame. Further, the sub-block prediction logic 107 may calculate the first derivative and the second derivative of the prior sub-block matrix. The sub-block generation logic 105 may then utilize the assigned look-up table curves and/or the first derivative and the second derivative of the sub-block matrix to determine the size of the sub-block matrix of the current image frame.

At step 508, the sub-block generation logic 105 may determine whether the size of the prior image frame's sub-block matrix or another sub-block matrix generated by the sub-block generation logic 105 is suitable for enhancing the desired features of the current image frame. If the size of the sub-blocks of the prior image frame's sub-block matrix is not suitable, then, at step 504, the sub-block generation logic 105 may divide the current image into sub-blocks of a different size by performing additional iterations. For example, the sub-block generation logic 105 may generate one or more sub-block matrices for the current image frame until a suitable size for enhancing the features of the current image frame is determined at step 508. At this step, since the sub-block generation logic 105 may have already performed multiple iterations for determining the prior sub-block matrix, the processing time for determining the suitable size for the sub-block matrix of the current image frame may be significantly reduced. In addition, the information or data associated with the look-up table curves and the first and second derivatives of the prior frame may additionally reduce the processing time for determining the suitable size for the sub-block matrix of the current image frame.

Still referring to FIG. 5, upon determining the suitable size of the sub-block matrix of the current image frame is suitable at step 508, the histogram enhancement logic 106 may generate histograms for each sub-block (or region) of the sub-block matrix of the current image frame at step 510. For example, the histogram enhancement logic 106 may generate histograms for each of the sub-blocks generated by the sub-block generation logic. The histogram enhancement logic 106 may then generate an equalized histogram of a target sub-block by determining the Cumulative Distribution Function (CDF) corresponding to the target sub-block of the current image frame. In one embodiment, the sub-block prediction logic 107 may assign one or more look-up table curves (e.g., look-up table curves 204) to the histograms and/or the first and second derivatives of the sub-blocks of each image frame. The histogram enhancement logic 106 may then utilize the information or data associated with the assigned look-up table curves and/or the first and second derivatives to predict and/or track the target sub-block of the current image frame based on the target sub-block of the prior image frame.

At step 512, the histogram enhancement logic 106 may clip the histograms at a clipping threshold level determined based on a prior frame's clipping threshold level. In one embodiment, the histogram enhancement logic 106 may utilize the information associated with the first derivative and the second derivative of the prior image frame for determining the suitable clipping threshold level. At step 514, the histogram enhancement logic 106 may determine whether the clipped histograms are suitable for enhancing the desired features of the current image frame. If the histograms clipped at the predetermined clipping threshold level is not suitable, then, at step 512, the histogram enhancement logic 106 may perform additional iterations. For example, the histogram enhancement logic 106 may generate one or more different clipping threshold levels for the current image frame until a suitable clipping threshold level for enhancing the desired features of the current image frame is determined at step 514. At this step, since the histogram enhancement logic 106 may have already performed multiple iterations for determining the prior frame's clipping threshold level, the processing time for determining the suitable clipping threshold level of the current image frame may be significantly reduced. In addition, the information or data associated with the first and second derivatives of the prior frame may additionally reduce the processing time for determining the suitable clipping threshold level.

Still referring to FIG. 5, upon determining the suitable clipping threshold level at step 514, the histogram enhancement logic 106 may map the pixel data obtained from the clipped histogram to generate an enhanced image frame for the current image frame at step 516. For example, the histogram enhancement logic 106 may assign pixel intensity values obtained from the clipped histogram to each pixel of the current image frame. The histogram enhancement logic 106 may then apply one or more interpolation functions to the enhanced image frame generated based on the mapping process. In one embodiment, the histogram enhancement logic 106 may interpolate one or more pixels of the enhanced image frame based on the location of each pixel in each sub-block of the enhanced image frame. At step 518, the histogram enhancement logic 106 may output the interpolation applied enhanced image frame to the imaging logic 104 to generate an enhanced real-time image stream based on the enhanced image frame.

Figure 6:
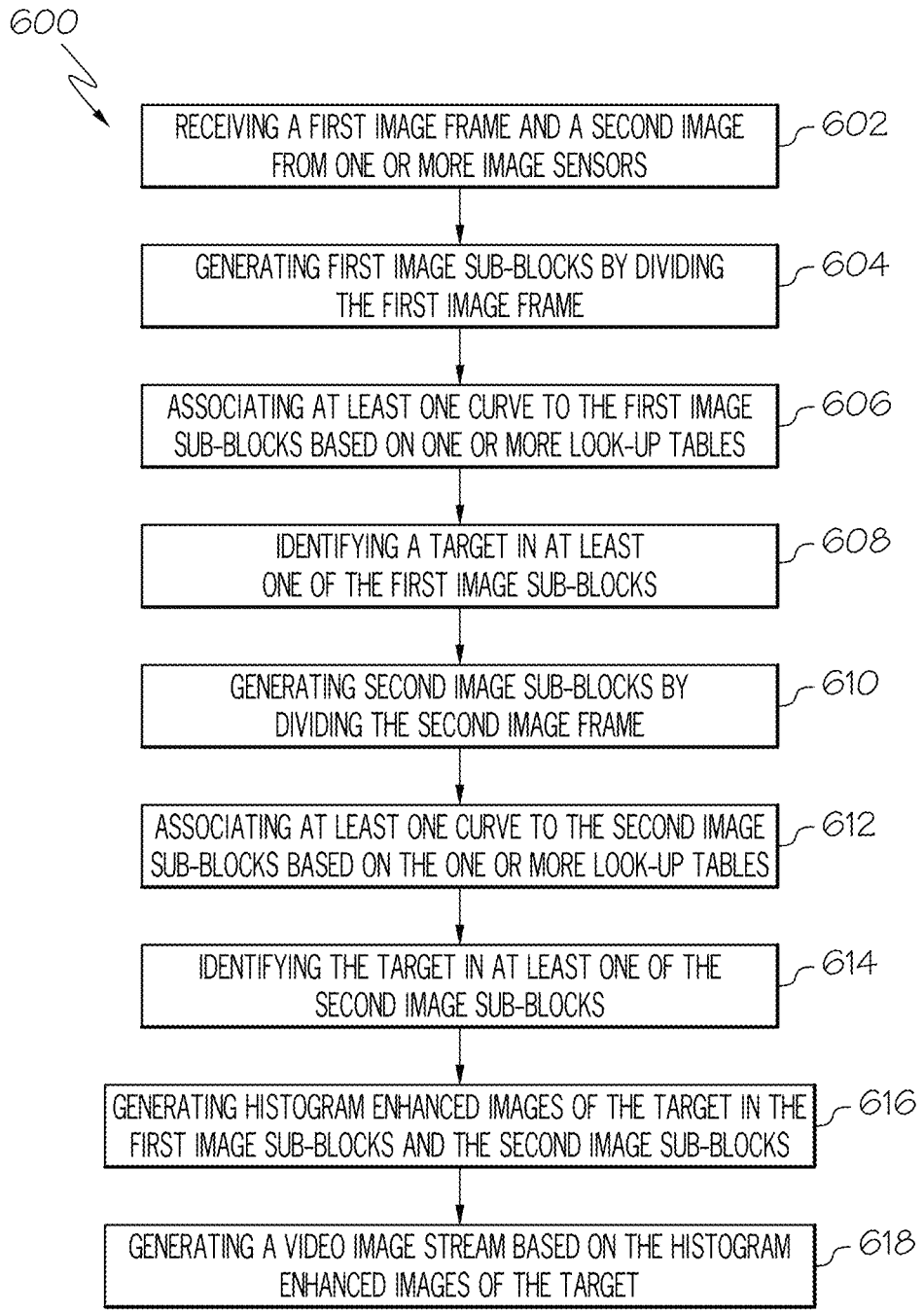
FIG. 6 illustrates a flow chart depicting an exemplary method of enhancing video images using the medical system of FIG. 1, according to aspects of this disclosure.

FIG. 6 shows a flow diagram of an exemplary method 600 for enhancing image frames for a video image stream. At step 602, the sub-block generation logic 105 may receive a first image frame and a second image frame from one or more image sensors. In one embodiment, the one or more image sensors may comprise a front facing image sensor and/or a side facing image sensor. At step 604, the sub-block generation logic 105 may generate first image sub-blocks by dividing the first image frame. At step 606, the sub-block prediction logic 107 may associate at least one curve to the first image sub-blocks based on one or more look-up tables. In one embodiment, the at least one curve may comprise a logarithmic curve, a power curve, an S-curve, a J-curve, or a piece-wise linear curve.

At step 608, the sub-block prediction logic 107 may identify a target in at least one of the first image sub-blocks. At step 610, the sub-block generation logic may generate second image sub-blocks. In one embodiment, the sub-block generation logic may generate the second image sub-blocks by dividing the second image frame based on the first image sub-blocks. At step 612, the sub-block prediction logic 107 may associate at least one curve to the second image sub-blocks based on the one or more look-up tables. In one embodiment, the histogram enhancement logic 106 may generate histogram data of each of the first image sub-blocks and/or the second image sub-blocks. The at least one curve of the first image sub-blocks and/or the at least one curve of the second image sub-blocks may be determined at least based on the histogram data of each of the first image sub-blocks and/or each of the second image sub-blocks. Further, the histogram data of each of the first image sub-blocks and/or the second image sub-blocks may be generated at least by applying a cumulative distribution function to the target in the first image sub-blocks and/or the second image sub-blocks.

At step 614, the sub-block prediction logic 107 may identify the target in at least one of the second image sub-blocks. In one embodiment, the sub-block prediction logic 107 may identify the target in the at least one of the second image sub-blocks based on the at least one curve of the first image sub-blocks and the at least one curve of the second image sub-blocks. In one embodiment, the sub-block prediction logic 107 may predict the target in the at least one of the second image sub-blocks based on similarities between the at least one curve of the first image sub-blocks and the at least one curve of the second image sub-blocks. In another embodiment, the sub-block prediction logic 107 may determine first sub-block data based on one or more derivatives of the first image sub-blocks, and may determine second sub-block data based on one or more derivatives of the second image sub-blocks. The one or more derivatives of the first image sub-blocks and/or the second image sub-blocks may comprise one or more derivatives of a gray-scale converted image and/or a color image. Further, the one or more derivatives of the first image sub-blocks and/or the one or more derivatives of the second image sub-blocks may comprise a first derivative and a second derivative. In one embodiment, the sub-block prediction logic 107 may locate the target in the at least one of the second image sub-blocks based on similarities between the one or more derivatives of the first image sub-blocks and the one or more derivatives of the second image sub-blocks. The one or more derivatives of the first image sub-blocks and/or the second image sub-blocks comprise a second derivative.

At step 616, the histogram enhancement logic 106 may generate histogram enhanced images of the target in the first image sub-blocks and the second image sub-blocks. In one embodiment, the histogram enhancement logic 106 may determine a clipping level of the target in the at least one of the first image sub-blocks. The clipping level of the target in the at least one of the first image sub-blocks may be based on the one or more derivatives of the first image sub-blocks. Further, the histogram enhancement logic 106 may determine a clipping level of the target in the at least one of the second image sub-blocks based at least on the clipping level of the target in the at least one of the first image sub-blocks and the one or more derivatives of the second image sub-blocks. Further, the histogram enhancement logic 106 may determine a clipping level of the target in the at least one of the second image sub-blocks based on the clipping level of the target in the at least one of the first image sub-blocks. In one embodiment, the histogram enhancement logic 106 may execute a piece-wise transformation on the first image sub-blocks and/or the second image sub-blocks based on the one or more look-up tables.

At step 618, the histogram enhancement logic 106 may generate a video image stream based on the histogram enhanced images of the target. In one embodiment, the histogram enhanced image frame may be generated by interpolating the histogram data of each of the first image sub-blocks and/or the second image sub-blocks.

Referring back to FIG. 1, which shows the display 109 of the medical system 100 communicatively coupled to the processor 102 of the image processing device 101, the processor 102 may be operable to transmit the enhanced image frames generated, in accordance with the processes and methods shown in FIGS. 2, 3A-3B, 4A-4B, 5, and 6, to the display 109 for viewing by a user of the medical system 100. In some examples, the medical system 100 may be configured and operable to continuously execute the processes and methods shown in FIGS. 2, 3A-3B, 4A-4B, 5, and 6, and described herein such that the display 109 may output an enhanced real-time video image stream to provide a continuous (e.g., live, real-time, etc.) images of the one or more target objects.

Each of the aforementioned systems, devices, assemblies, and methods may be used of enhance image frames to generate an enhanced real-time video image stream. By providing a medical device including an image processing system, a user may enhance a visualization of one or more features and/or characteristics of a target site within a subject during a procedure by generating an enhanced real-time video image stream using histogram enhanced data of one or more previous image frames. The medical device may allow a user to accurately identify a location of a target site, thereby reducing overall procedure time, increasing efficiency of procedures, and avoiding unnecessary harm to a subject's body caused by inaccurately locating target objects in the target treatment site.

It will be apparent to those skilled in the art that various modifications and variations may be made in the disclosed devices and methods without departing from the scope of the disclosure. It should be appreciated that the disclosed devices may include various suitable computer systems and/or computing units incorporating a plurality of hardware components, such as, for example, a processor and non-transitory computer-readable medium, that allow the devices to perform one or more operations during a procedure in accordance with those described herein. Other aspects of the disclosure will be apparent to those skilled in the art from consideration of the specification and practice of the features disclosed herein. It is intended that the specification and examples be considered as exemplary only.

It should be appreciated that the image processing device 101 in FIG. 1 may be any computing device. The image processing device 101 also may include input and output ports to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

In one embodiment, any of the disclosed systems, methods, and/or graphical user interfaces may be executed by or implemented by a computing system consistent with or similar to the descriptions herein. Although not required, aspects of this disclosure are described in the context of computer-executable instructions, such as routines executed by a data processing device, e.g., a server computer, wireless device, and/or personal computer. Those skilled in the relevant art will appreciate that aspects of this disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "computing device," and the like, are generally used interchangeably herein, and refer to any of the above devices and systems, as well as any data processor.

Aspects of this disclosure may be embodied in a special purpose computer and/or data processor that is specifically programmed, configured, and/or constructed to perform one or more of the computer-executable instructions explained in detail herein. While aspects of this disclosure, such as certain functions, are described as being performed exclusively on a single device, this disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of this disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of this disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

It should be understood that one or more of the aspects of any of the medical devices described herein may be using in combination with any other medical device known in the art, such as medical imaging systems or other scopes such as colonoscopes, bronchoscopes, ureteroscopes, duodenoscopes, etc., or other types of imagers.

While principles of this disclosure are described herein with reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, the invention is not to be considered as limited by the foregoing description.

We claim:

1. A method of enhancing video images in a medical device, the method comprising:
   receiving a first image frame and a second image frame from one or more image sensors;
   generating first image sub-blocks by dividing the first image frame;
   associating at least one curve to the first image sub-blocks based on one or more look-up tables;
   identifying a target in at least one of the first image sub-blocks;
   generating second image sub-blocks by dividing the second image frame based on the first image sub-blocks;
   associating at least one curve to the second image sub-blocks based on the one or more look-up tables;
   identifying the target in at least one of the second image sub-blocks;
   generating histogram enhanced images of the target in the first image sub-blocks and the second image sub-blocks; and
   generating a video image stream based on the histogram enhanced images of the target.

2. The method of claim 1, further comprising:
   identifying the target in the at least one of the second image sub-blocks based on the at least one curve of the first image sub-blocks and the at least one curve of the second image sub-blocks.

3. The method of claim 1, further comprising:
   generating histogram data of each of the first image sub-blocks and/or the second image sub-blocks,
   wherein the at least one curve of the first image sub-blocks and/or the at least one curve of the second image sub-blocks are determined at least based on the histogram data of each of the first image sub-blocks and/or each of the second image sub-blocks.

4. The method of claim 3, wherein the histogram data of each of the first image sub-blocks and/or the second image sub-blocks is generated at least by applying a cumulative distribution function to the target in the first image sub-blocks and/or the second image sub-blocks.

5. The method of claim 3, wherein generating the histogram enhanced image frame comprises interpolating the histogram data of each of the first image sub-blocks and/or the second image sub-blocks.

6. The method of claim 1, further comprising:
   determining a clipping level of the target in the at least one of the first image sub-blocks; and
   determining a clipping level of the target in the at least one of the second image sub-blocks based on the clipping level of the target in the at least one of the first image sub-blocks.

7. The method of claim 1, further comprising:
   executing a piece-wise transformation on the first image sub-blocks and/or the second image sub-blocks based on the one or more look-up tables.

8. The method of claim 1, wherein identifying the target in at least one of the second image sub-blocks further comprises:
   predicting the target in the at least one of the second image sub-blocks based on similarities between the at least one curve of the first image sub-blocks and the at least one curve of the second image sub-blocks.

9. The method of claim 1, wherein the at least one curve comprises a logarithmic curve, a power curve, an S-curve, a J-curve, or a piece-wise linear curve.

10. The method of claim 1, wherein identifying the target in at least one of the second image sub-blocks further comprises:
    determining first sub-block data based on one or more derivatives of the first image sub-blocks; and
    determining second sub-block data based on one or more derivatives of the second image sub-blocks.

11. The method of claim 10, wherein the one or more derivatives of the first image sub-blocks and/or the second image sub-blocks comprises one or more derivatives of a gray-scale converted image and/or a color image.

12. The method of claim 10, wherein the one or more derivatives of the first image sub-blocks and/or the one or more derivatives of the second image sub-blocks comprise a first derivative and a second derivative.

13. The method of claim 10, further comprising:
    locating the target in the at least one of the second image sub-blocks based on similarities between the one or more derivatives of the first image sub-blocks and the one or more derivatives of the second image sub-blocks.

14. The method of claim 12, wherein the one or more derivatives of the first image sub-blocks and/or the second image sub-blocks comprise a second derivative.

15. The method of claim 10, further comprising:
determining a clipping level of the target in the at least one of the first image sub-blocks based on the one or more derivatives of the first image sub-blocks; and
determining a clipping level of the target in the at least one of the second image sub-blocks based at least on the clipping level of the target in the at least one of the first image sub-blocks and the one or more derivatives of the second image sub-blocks.

16. A medical device, comprising:
a shaft;
one or more image sensors coupled to a distal end of the shaft;
at least one illumination device coupled to the distal end of the shaft;
one or more computer readable media storing instructions performing image processing to enhance video images; and
one or more processors configured to execute the instructions to perform the image processing, the instructions comprising:
receiving a first image frame and a second image frame from the one or more image sensors;
generating first image sub-blocks by dividing the first image frame;
associating at least one curve to the first image sub-blocks;
identifying a target in at least one of the first image sub-blocks;
generating second image sub-blocks by dividing the second image frame based on the first image sub-blocks;
associating at least one curve to the second image sub-blocks based on one or more look-up tables;
identifying the target in at least one of the second image sub-blocks;
generating histogram enhanced images of the target in the first image sub-blocks and the second image sub-blocks; and
generating a video image stream based on the histogram enhanced images of the target.

17. The device of claim 16, wherein the one or more image sensors comprise a front facing image sensor and/or a side facing image sensor.

18. The device of claim 16, wherein the instructions further comprise:
generating histogram data of each of the first image sub-blocks and/or the second image sub-blocks,
wherein the at least one curve of the first image sub-blocks and/or the at least one curve of the second image sub-blocks are determined at least based on the histogram data of each of the first image sub-blocks and/or each of the second image sub-blocks.

19. The device of claim 16, wherein identifying the target in at least one of the second image sub-blocks further comprises:
determining first sub-block data based on one or more derivatives of the first image sub-blocks; and
determining second sub-block data based on one or more derivatives of the second image sub-blocks.

20. A non-transitory computer-readable medium storing instructions for enhancing video images, the instructions, when executed by one or more processors, causing the one or more processors to perform operations comprising:
receiving a first image frame and a second image frame from one or more image sensors;
generating first image sub-blocks by dividing the first image frame;
associating at least one curve to the first image sub-blocks based on one or more look-up tables;
identifying a target in at least one of the first image sub-blocks;
generating second image sub-blocks by dividing the second image frame based on the first image sub-blocks;
associating at least one curve to the second image sub-blocks based on the one or more look-up tables;
identifying the target in at least one of the second image sub-blocks;
generating histogram enhanced images of the target in the first image sub-blocks and the second image sub-blocks; and
generating a video image stream based on the histogram enhanced images of the target.

* * * * *